(12) United States Patent
Xue et al.

(10) Patent No.: US 9,731,352 B2
(45) Date of Patent: Aug. 15, 2017

(54) WHEEL ALIGNMENT DEVICE

(71) Applicant: CITIC Dicastal CO., LTD, Qinhuangdao (CN)

(72) Inventors: Bowen Xue, Qinhuangdao (CN);
Donghui Zhang, Qinhuangdao (CN);
Jiandong Guo, Qinhuangdao (CN)

(73) Assignee: CITIC DICASTAL CO., LTD., Qinhuangdao (CN)

( * ) Notice: Subject to any disclaimer, the term of this patent is extended or adjusted under 35 U.S.C. 154(b) by 0 days.

(21) Appl. No.: 15/074,611

(22) Filed: Mar. 18, 2016

(65) Prior Publication Data
US 2016/0346844 A1     Dec. 1, 2016

(30) Foreign Application Priority Data

Jun. 1, 2015 (CN) .......................... 2015 1 0290724

(51) Int. Cl.
*B23B 5/28* (2006.01)
*B23B 31/40* (2006.01)
*B23Q 7/18* (2006.01)

(52) U.S. Cl.
CPC .............. *B23B 5/28* (2013.01); *B23B 31/402* (2013.01); *B23Q 7/18* (2013.01); *B23B 2215/08* (2013.01);
(Continued)

(58) Field of Classification Search
CPC .... B23B 5/28; B23B 5/26; B23B 5/02; B23B 5/04; B23B 5/00; B23B 31/1223;
(Continued)

(56) References Cited

U.S. PATENT DOCUMENTS

| | | | | |
|---|---|---|---|---|
| 1,426,168 | A | * | 8/1922 | Flick ................. B23B 31/16287 144/154 |
| 2,542,616 | A | * | 2/1951 | Barrett ...................... B23B 5/02 408/62 |

(Continued)

*Primary Examiner* — Will Fridie, Jr.
(74) *Attorney, Agent, or Firm* — Hamre, Schumann, Mueller, & Larson, P.C.

(57) ABSTRACT

The invention discloses an improved wheel alignment device which comprises a rack, a cylinder, a servo motor, a hollow shaft and the like. When the improved wheel alignment device is used, a stopper on a roller table centers a wheel, air enters at the lower end of a large piston and causes a long cylinder rod, a flange end cover, an expanding sleeve and the like to rise; the flange end cover is in contact with a wheel flange plate, and after the expanding sleeve is in contact with a central hole, air enters at the upper end of a small piston of a small cylinder, a short cylinder rod pulls an expanding core downwards, and the expanding sleeve clamps the central hole of the wheel; the servo motor causes the hollow shaft and the wheel to rotate by a belt pulley I and a belt pulley II, and the hollow shaft and the wheel stop rotating after a sensor finds the position of a valve hole of the wheel; at the moment, lifting cylinders cause a supporting plate to rise to a certain height through guide pillars, and a large cylinder causes the wheel to descend and the lower end surface of the wheel to fall above the supporting plate. The improved wheel alignment device can realize the alignment function before the automatic machining of wheel finish turning in use, and when the wheels with different wheel widths and different offset distances are automatically produced, programs do not need to be switched.

1 Claim, 3 Drawing Sheets

(52) U.S. Cl.
CPC ....... *B23B 2222/04* (2013.01); *B23B 2270/12* (2013.01); *B60B 2310/228* (2013.01)

(58) Field of Classification Search
CPC .......... B23B 31/16287; B23B 31/4053; B23B 31/4073; B24B 19/26; B23Q 3/186
See application file for complete search history.

(56) References Cited

U.S. PATENT DOCUMENTS

| | | | | |
|---|---|---|---|---|
| 3,345,892 | A * | 10/1967 | Dombrowski | B23B 5/28 82/104 |
| 3,456,401 | A * | 7/1969 | Kushmuk | B24B 7/16 451/424 |
| 3,592,088 | A * | 7/1971 | Welling | B23B 5/04 82/112 |
| 2003/0000352 | A1 * | 1/2003 | Caorle | B23B 5/02 82/112 |
| 2006/0042091 | A1 * | 3/2006 | Luschei | B23B 1/00 29/894.35 |

* cited by examiner

WHEEL ALIGNMENT DEVICE

FIELD OF THE INVENTION

The invention relates to an alignment device, and particularly relates to an improved alignment device used before the automatic machining of wheel finish turning.

BACKGROUND OF THE INVENTION

In the machining process of aluminium alloy wheels, the degree of automation becomes higher and higher, and the front finish turning of products has been brought into the scope of automatic production by people. Due to specificity of the products, the fronts of vehicles are not allowed to be touched by hands and other things after machining, and therefore, mechanical arms must be used for grabbing lower rims of the wheels in order to realize the automatic machining of the wheels. The mechanical arms are required for putting the lower end surface of the wheel at a fixed height during grabbing every time in order that when wheel types are changed every time, the operational programs of robots are not changed, and the mechanical arms can recognize the position of the valve hole in order to realize the measurement of the height of the end surface inside a machine tool after clamping. Based the above situations, the device can solve the problems very well.

SUMMARY OF THE INVENTION

The invention aims at providing an improved wheel alignment device which can realize the alignment function before automatic machining of wheel finish turning, and when the wheels with different wheel widths and different offset distances are automatically produced, programs do not need to be switched.

In order to achieve the purpose, the technical solution of the invention is as follows: the improved wheel alignment device comprises a rack, guide pillars, lifting cylinders, a belt pulley I, a lifting plate, guide sleeves, a servo motor, a large piston, a long cylinder rod, a guide rod, a hollow shaft, a bearing pedestal, an upper end cover, a small piston, a short cylinder rod, a flange end cover, an expanding sleeve, an expanding core, a supporting plate, a lower end cover, a belt pulley II and a rotary joint and is characterized in that: the two lifting cylinders and the four guide pillars are fixed at the bottom of the rack; the output ends of the lifting cylinders are hinged with the lower part of the lifting plate, the four guide sleeves, the servo motor and the bearing pedestal are all fixed above the lifting plate, and the guide sleeves are matched with the guide pillars, wherein the belt pulley I is fixed at the output end of the servo motor.

The large cylinder is formed by the large piston, the long cylinder rod, the guide rod, the hollow shaft, the upper end cover and the lower end cover; the large piston is matched with an inner cavity of the hollow shaft, and the upper end cover is arranged at the upper end of the hollow shaft and matched with the long cylinder rod, wherein the long cylinder rod is fixed at the upper end of the large piston; and the lower end cover is fixed at the lower end of the hollow shaft, and the guide rod is fixed between the upper end cover and the lower end cover and matched with the large piston.

The small cylinder is formed by the small piston, the short cylinder rod, the flange end cover and the expanding sleeve, the small piston is matched with a hollow part of the top end of the long cylinder rod, and the flange end cover is arranged at the top end of the long cylinder rod and matched with the short cylinder rod, wherein the short cylinder rod is fixed at the upper end of the small piston, and the expanding sleeve is fixed above the flange end cover; and what is said above forms the small cylinder.

The expanding core is fixed at the top end of the short cylinder rod and matched with the expanding sleeve; the supporting plate is fixed at the top end of the bearing pedestal; the hollow shaft is fixed inside the bearing pedestal by a bearing; and both the belt pulley II and the rotary joint are fixed below the lower end cover.

In actual use, the stopper on the roller table centers the wheel, air enters at the lower end of the large piston and causes the long cylinder rod, the flange end cover, the expanding sleeve and the like to rise; the flange end cover is in contact with the wheel flange plate, and after the expanding sleeve is in contact with the central hole, air enters at the upper end of the small piston of the small cylinder, the short cylinder rod pulls the expanding core downwards, and the expanding sleeve clamps the central hole of the wheel; the servo motor causes the hollow shaft and the wheel to rotate by the belt pulley I and the belt pulley II, and the hollow shaft and the wheel stop rotating after the sensor finds the position of the valve hole of the wheel; at the moment, the lifting cylinders cause the supporting plate to rise to a certain height through the guide pillars, and the large cylinder causes the wheel to descend and the lower end surface of the wheel to fall above the supporting plate.

The improved wheel alignment device can realize the alignment function before automatic machining of wheel finish turning in use, and when the wheels with different wheel widths and different offset distances are automatically produced, the programs do not need to be switched. At the same time, the improved wheel alignment device has the prominent advantages of wide application range, high degree of automation, safe and stable performance, low manufacturing cost and the like.

Figure 1:
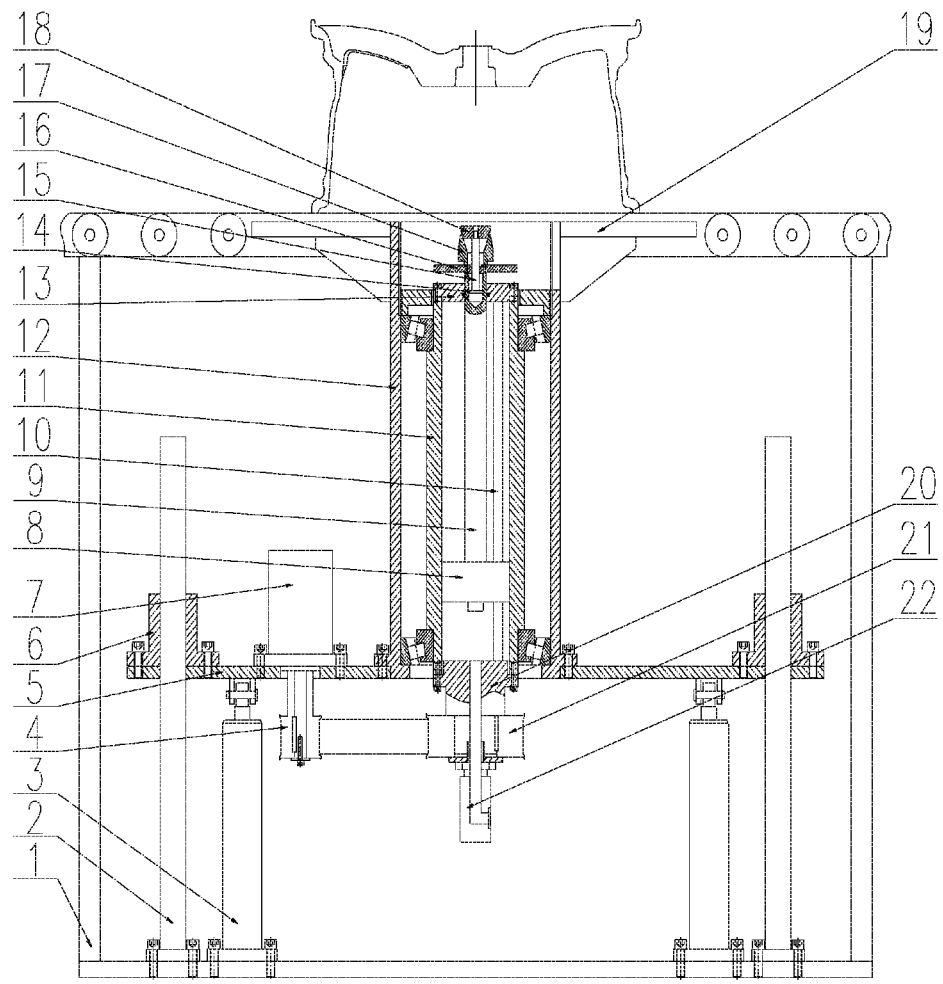
FIG. 1 is a front view of the improved wheel alignment device provided by the invention.
Figure 2:
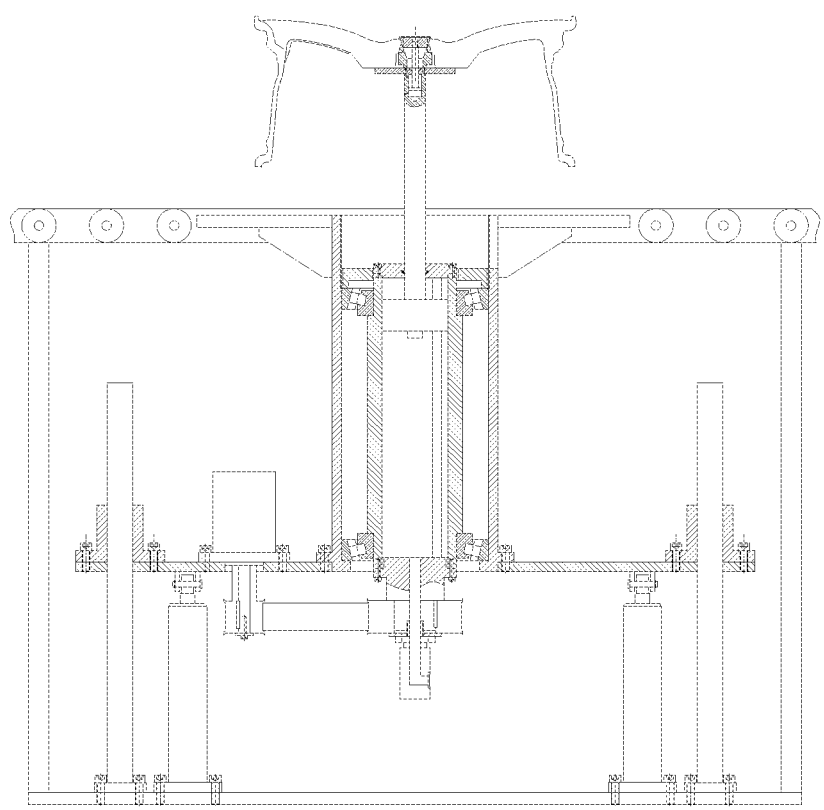
FIG. 2 is a front view after the wheel is lifted by the improved wheel alignment device provided by the invention.
Figure 3:
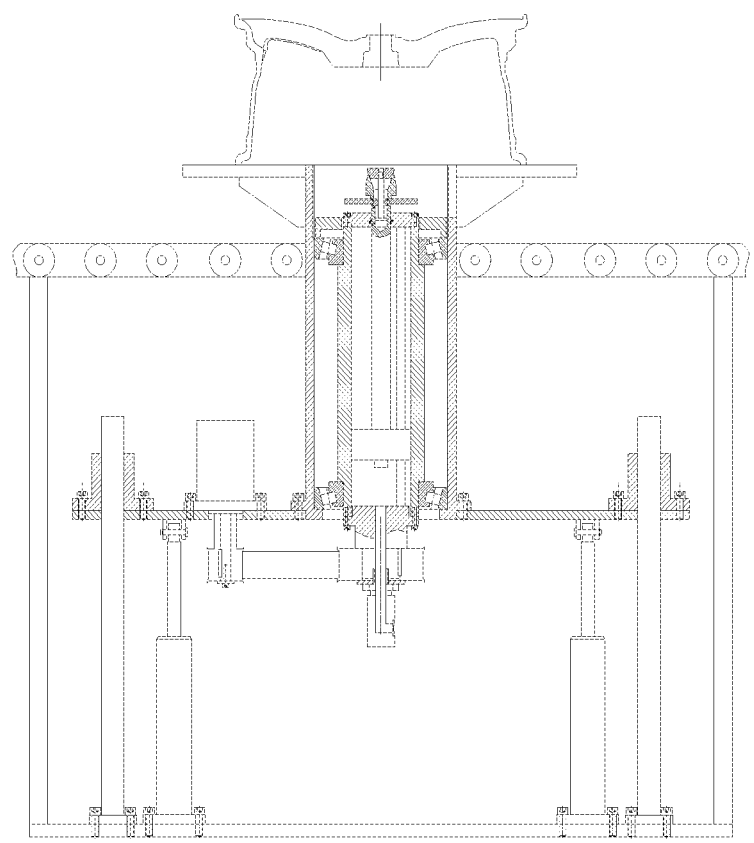
FIG. 3 is a front view after the wheel is aligned by the improved wheel alignment device provided by the invention.

IN THE DRAWINGS 1-rack, 2-guide pillar, 3-lifting cylinder, 4-belt pulley I, 5-lifting plate, 6-guide sleeve, 7-servo motor, 8-large piston, 9-long cylinder rod, 10-guide rod, 11-hollow shaft, 12-bearing pedestal, 13-upper end cover, 14-small piston, 15-short cylinder rod, 16-flange end cover, 17-expanding sleeve, 18-expanding core, 19-supporting plate, 20-lower end cover, 21-belt pulley II, 22-rotary joint.

DETAILED DESCRIPTION OF THE INVENTION

Details and working conditions of the improved wheel alignment device provided by the invention are described below with reference to the drawings.

The improved wheel alignment device comprises a rack 1, guide pillars 2, lifting cylinders 3, a belt pulley I 4, a lifting plate 5, guide sleeves 6, a servo motor 7, a large piston 8, a long cylinder rod 9, a guide rod 10, a hollow shaft 11, a bearing pedestal 12, an upper end cover 13, a small piston 14, a short cylinder rod 15, a flange end cover 16, an expanding sleeve 17, an expanding core 18, a supporting plate 19, a lower end cover 20, a belt pulley II 21, a rotary joint 22 and the like, wherein the two lifting cylinders 3 and the four guide pillars 2 are fixed at the bottom of the rack 1; the output ends of the lifting cylinders 3 are hinged with the lower part of the lifting plate 5, the four guide sleeves 6, the servo motor 7 and the bearing pedestal 12 are all fixed above the lifting plate 5, and the guide sleeves 6 are matched with the guide pillars 2, wherein the belt pulley I 4 is fixed at the output end of the servo motor 7.

The large cylinder is formed by the large piston 8, the long cylinder rod 9, the guide rod 10, the hollow shaft 11, the upper end cover 13 and the lower end cover 20; the large piston 8 is matched with an inner cavity of the hollow shaft 11, and the upper end cover 13 is arranged at the upper end of the hollow shaft 11 and matched with the long cylinder rod 9, wherein the long cylinder rod 9 is fixed at the upper end of the large piston 8; and the lower end cover 20 is fixed at the lower end of the hollow shaft 11, and the guide rod 10 is fixed between the upper end cover 13 and the lower end cover 20 and matched with the large piston 8.

The small cylinder is formed by the small piston 14, the short cylinder rod 15, the flange end cover 16 and the expanding sleeve 17, the small piston 14 is matched with a hollow part of the top end of the long cylinder rod 9, and the flange end cover 16 is arranged at the top end of the long cylinder rod 9 and matched with the short cylinder rod 15, wherein the short cylinder rod 15 is fixed at the upper end of the small piston 14, and the expanding sleeve 17 is fixed above the flange end cover 16.

The expanding core 18 is fixed at the top end of the short cylinder rod 15 and matched with the expanding sleeve 17; the supporting plate 19 is fixed at the top end of the bearing pedestal 12; the hollow shaft 11 is fixed inside the bearing pedestal 12 by the bearing; and both the belt pulley II 21 and the rotary joint 22 are fixed below the lower end cover 20.

In the working process, the stopper on the roller table centers the wheel, air enters at the lower end of the large piston 8 and causes the long cylinder rod 9, the flange end cover 16, the expanding sleeve 17 and the like to rise; the flange end cover 16 is in contact with the wheel flange plate, and after the expanding sleeve 17 is in contact with the central hole, air enters at the upper end of the small piston 14 of the small cylinder, the short cylinder rod 15 pulls the expanding core 18 downwards, and the expanding sleeve 17 clamps the central hole of the wheel; the servo motor 7 causes the hollow shaft 11 and the wheel to rotate by the belt pulley I 4 and the belt pulley II 21, and the hollow shaft and the wheel stop rotating after the sensor finds the position of the valve hole of the wheel; and at the moment, the lifting cylinders 3 cause the supporting plate to rise to a certain height through the guide pillars 2, and the large cylinder causes the wheel to descend and the lower end surface of the wheel to fall above the supporting plate 19.

The invention claimed is:

1. An improved wheel alignment device, comprising a rack, guide pillars, lifting cylinders, a belt pulley I, a lifting plate, guide sleeves, a servo motor, a large piston, a long cylinder rod, a guide rod, a hollow shaft, a bearing pedestal, an upper end cover, a small piston, a short cylinder rod, a flange end cover, an expanding sleeve, an expanding core, a supporting plate, a lower end cover, a belt pulley II and a rotary joint, characterized in that: the two lifting cylinders and the four guide pillars are fixed at the bottom of the rack; the output ends of the lifting cylinders are hinged with the lower part of the lifting plate, the four guide sleeves, the servo motor and the bearing pedestal are all fixed above the lifting plate, and the guide sleeves are matched with the guide pillars, wherein the belt pulley I is fixed at the output end of the servo motor;

the large cylinder is formed by the large piston, the long cylinder rod, the guide rod, the hollow shaft, the upper end cover and the lower end cover, the large piston is matched with an inner cavity of the hollow shaft, and the upper end cover is arranged at the upper end of the hollow shaft and matched with the long cylinder rod, wherein the long cylinder rod is fixed at the upper end of the large piston; the lower end cover is fixed at the lower end of the hollow shaft, and the guide rod is fixed between the upper end cover and the lower end cover and matched with the large piston;

the small cylinder is formed by the small piston, the short cylinder rod, the flange end cover and the expanding sleeve, the small piston is matched with a hollow part of the top end of the long cylinder rod, and the flange end cover is arranged at the top end of the long cylinder rod and matched with the short cylinder rod, wherein the short cylinder rod is fixed at the upper end of the small piston, and the expanding sleeve is fixed above the flange end cove;

the expanding core is fixed at the top end of the short cylinder rod and matched with the expanding sleeve; the supporting plate is fixed at the top end of the bearing pedestal; the hollow shaft is fixed inside the bearing pedestal by a bearing; and both the belt pulley II and the rotary joint are fixed below the lower end cover.

* * * * *